US011019812B1

(12) United States Patent
Glassberg

(10) Patent No.: US 11,019,812 B1
(45) Date of Patent: Jun. 1, 2021

(54) TACKLE CONTAINER AND KIT

(71) Applicant: David Glassberg, Woodbury, NJ (US)

(72) Inventor: David Glassberg, Woodbury, NJ (US)

( * ) Notice: Subject to any disclaimer, the term of this patent is extended or adjusted under 35 U.S.C. 154(b) by 0 days.

(21) Appl. No.: 16/860,143

(22) Filed: Apr. 28, 2020

(51) Int. Cl.
*A01K 97/06* (2006.01)
*A01K 97/22* (2006.01)

(52) U.S. Cl.
CPC .............. *A01K 97/22* (2013.01); *A01K 97/06* (2013.01)

(58) Field of Classification Search
CPC ...................................................... A01K 97/06
USPC ..... 43/54.1; 206/315.11, 6.1, 349, 372, 373, 206/376, 379; 224/920; 248/220.22, 248/221.11, 222.12, 225.11, 300, 301, 248/304, 305, 309.1, 311.2, 312, 312.1, 248/313–315, 316.1, 316.2, 316.3, 316.4, 248/316.5, 316.6, 316.7
See application file for complete search history.

(56) References Cited

U.S. PATENT DOCUMENTS

| | | | | | |
|---|---|---|---|---|---|
| 441,266 | A | * | 11/1890 | Volz | B44D 3/123 248/110 |
| 1,073,679 | A | * | 9/1913 | Haussman | F16M 13/02 248/316.5 |
| 1,125,585 | A | * | 1/1915 | Menger | B65D 51/246 220/735 |
| 2,035,639 | A | * | 3/1936 | Davis | B60S 5/00 211/86.01 |
| 2,316,833 | A | * | 4/1943 | Baron | A01K 97/06 43/57.1 |
| 2,436,924 | A | * | 3/1948 | Hansen | B44D 3/10 211/65 |
| 2,555,053 | A | * | 5/1951 | Myrick | B44D 3/123 248/113 |
| 2,640,596 | A | * | 6/1953 | Reeder | B60R 7/08 224/401 |
| 2,762,674 | A | * | 9/1956 | Sauvago | A01K 97/06 312/305 |
| 3,336,693 | A | * | 8/1967 | Lussier | A01K 97/06 43/54.1 |
| 3,442,435 | A | * | 5/1969 | Huston | B65D 81/3216 220/528 |
| 3,659,369 | A | * | 5/1972 | Hermanson | A01K 97/10 43/21.2 |

(Continued)

FOREIGN PATENT DOCUMENTS

| | | | | | |
|---|---|---|---|---|---|
| EP | 1407663 | A1 | * | 4/2004 | ............ A01K 97/06 |
| FR | 2829664 | A1 | * | 3/2003 | ............ A01K 97/06 |

(Continued)

*Primary Examiner* — Darren W Ark
(74) *Attorney, Agent, or Firm* — Joseph E. Maenner; Petock & Petock LLC

(57) ABSTRACT

A modular tackle container includes a bucket having a sidewall. The sidewall has an inner wall, an outer wall, and a top surface connecting the inner wall and the outer wall. A plurality of brackets are configured to be removably supported on the top of the sidewall. Each of the plurality of brackets has an outer portion configured to face the outer wall, a top portion configured to engage the top surface, and an inner portion configured to face the inner wall. The inner portion includes a generally tee-shaped support. A holder is releasably attachable to the tee-shaped support. The holder has a receiver configured to slide onto the tee-shaped support such that the tee-shaped support vertically supports the holder.

6 Claims, 17 Drawing Sheets

(56) References Cited

U.S. PATENT DOCUMENTS

| | | | | |
|---|---|---|---|---|
| 3,751,845 A * | 8/1973 | van Leeuwen | A01K 97/06 | 43/56 |
| 3,897,650 A * | 8/1975 | Pilston | A01K 97/06 | 43/54.1 |
| 4,159,773 A * | 7/1979 | Losenno | A47G 29/08 | 211/70.6 |
| 4,383,385 A * | 5/1983 | Myers | A01K 97/06 | 224/920 |
| 4,538,862 A * | 9/1985 | Chandler | B65D 25/10 | 312/184 |
| 4,696,447 A * | 9/1987 | Strecker | A45D 20/12 | 248/206.3 |
| 4,746,090 A * | 5/1988 | Hamilton | A45D 20/12 | 248/314 |
| 4,759,148 A * | 7/1988 | Love | A01K 97/04 | 220/23.89 |
| 4,770,327 A * | 9/1988 | Fortson | A01K 97/06 | 220/533 |
| 4,780,982 A * | 11/1988 | Black | A01K 89/003 | 242/137 |
| 4,825,590 A * | 5/1989 | Cullinane | A47G 7/044 | 248/229.16 |
| 4,826,007 A * | 5/1989 | Skeie | A63H 33/30 | 206/373 |
| 4,867,332 A * | 9/1989 | Mains | B25H 3/04 | 220/735 |
| 4,925,026 A * | 5/1990 | McKay | B25H 3/02 | 206/372 |
| 4,936,044 A * | 6/1990 | Bruce | A01K 97/06 | 43/57.1 |
| 4,947,577 A * | 8/1990 | Abbotoy | A01K 97/06 | 43/57.1 |
| 4,961,555 A * | 10/1990 | Egan, Jr. | A47G 23/0225 | 211/41.2 |
| 5,020,269 A * | 6/1991 | Gentry | A01K 97/06 | 206/315.11 |
| 5,125,183 A * | 6/1992 | Tisdell | A01K 97/06 | 43/54.1 |
| 5,185,952 A * | 2/1993 | Bruce | A01K 97/06 | 206/315.11 |
| 5,190,252 A * | 3/1993 | Schrager | B65F 1/06 | 248/97 |
| 5,230,452 A * | 7/1993 | Wagner | A01K 97/06 | 206/315.11 |
| 5,261,561 A * | 11/1993 | Hodges, Jr. | B65D 25/00 | 206/315.11 |
| 5,271,520 A * | 12/1993 | McAfee | A01K 97/06 | 206/315.11 |
| 5,303,500 A * | 4/1994 | Luukonen | A01K 97/01 | 206/315.11 |
| 5,350,065 A * | 9/1994 | Darrey | B25H 3/00 | 206/373 |
| 5,419,154 A * | 5/1995 | Christoff | A45F 3/16 | 220/709 |
| 5,471,779 A * | 12/1995 | Downey | A01K 97/22 | 206/315.11 |
| D365,745 S * | 1/1996 | Brendel | D8/333 | |
| 5,604,958 A * | 2/1997 | Anscher | A45C 7/0086 | 224/197 |
| 5,743,415 A * | 4/1998 | Smart | A45D 20/12 | 211/70.6 |
| 5,944,295 A * | 8/1999 | McSherry | F16B 25/103 | 248/304 |
| 6,016,673 A * | 1/2000 | McDaid | B62H 5/003 | 224/451 |
| 6,073,387 A * | 6/2000 | Torkilsen | A01K 97/01 | 206/315.11 |
| 6,237,802 B1 * | 5/2001 | Douglas | B44D 3/123 | 220/736 |
| 6,301,826 B1 * | 10/2001 | Thorpe | A01K 97/06 | 43/57.1 |
| 6,318,691 B1 * | 11/2001 | Toth, Jr. | A45D 20/12 | 248/231.41 |
| 6,637,707 B1 * | 10/2003 | Gates | A47B 81/005 | 211/64 |
| 6,785,999 B1 * | 9/2004 | Spada | A01K 97/22 | 43/54.1 |
| 7,036,267 B2 * | 5/2006 | Klein | A01K 97/01 | 43/54.1 |
| 7,043,871 B2 * | 5/2006 | Chapel | A01K 97/06 | 43/57.1 |
| 7,044,424 B2 * | 5/2006 | Robertson | A47F 3/0439 | 206/561 |
| 7,389,608 B1 * | 6/2008 | MacKay | A01K 97/05 | 206/315.11 |
| 7,661,917 B2 * | 2/2010 | Horvath | F16B 25/0026 | 411/400 |
| 7,748,583 B1 * | 7/2010 | Woltman | A45D 20/12 | 224/251 |
| 7,913,446 B1 * | 3/2011 | Aldridge, III | A01K 97/06 | 43/57.1 |
| 8,033,518 B2 * | 10/2011 | Schuchman | B60N 3/103 | 248/311.2 |
| 8,103,155 B2 * | 1/2012 | Dannenberg | A45D 20/12 | 392/381 |
| 8,434,615 B2 * | 5/2013 | Balogh | A45C 11/00 | 206/349 |
| 8,757,573 B1 * | 6/2014 | Barnes, Jr. | A47G 23/0225 | 248/311.2 |
| 8,806,803 B1 * | 8/2014 | Mitchell | A01K 97/06 | 43/54.1 |
| 8,814,263 B2 * | 8/2014 | Cassese | A47G 19/06 | 297/188.18 |
| 9,192,254 B2 * | 11/2015 | Gilbert | A47F 7/00 | |
| 9,468,200 B1 * | 10/2016 | Davis | A01K 97/00 | |
| 9,682,471 B2 * | 6/2017 | Jacobson | B65D 1/12 | |
| 9,807,993 B2 * | 11/2017 | Montoya | A47F 5/0823 | |
| 9,854,793 B2 * | 1/2018 | Hawley, Jr. | A01K 97/06 | |
| 10,130,089 B2 * | 11/2018 | Pippins | A01K 97/22 | |
| D876,742 S * | 2/2020 | Pollard | D32/54 | |
| 2005/0199770 A1 * | 9/2005 | Andrews | B60N 3/103 | 248/311.2 |
| 2008/0185493 A1 * | 8/2008 | Wakefield | A01K 97/06 | 248/512 |
| 2009/0014615 A1 * | 1/2009 | Hausladen | B67C 3/242 | 248/311.2 |
| 2014/0331543 A1 * | 11/2014 | Hancock | A01K 97/10 | 43/17 |
| 2015/0196113 A1 * | 7/2015 | Jacobson | B25H 3/00 | 206/361 |
| 2019/0387728 A1 * | 12/2019 | Constantine | A01K 97/06 | |

FOREIGN PATENT DOCUMENTS

| | | | | |
|---|---|---|---|---|
| JP | 06303886 A | * | 11/1994 | |
| JP | 09172930 A | * | 7/1997 | |
| JP | 2002253098 A | * | 9/2002 | |
| WO | WO-9102457 A1 | * | 3/1991 | A01K 97/06 |
| WO | WO-0156377 A1 | * | 8/2001 | A01K 97/06 |

* cited by examiner

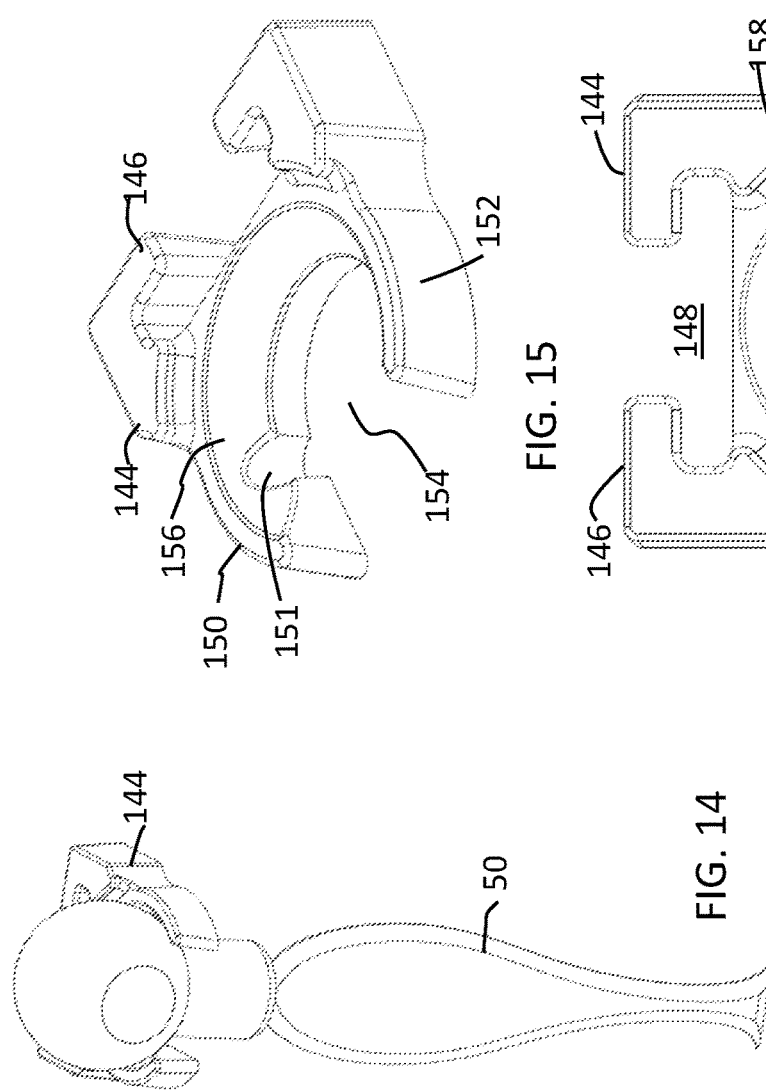

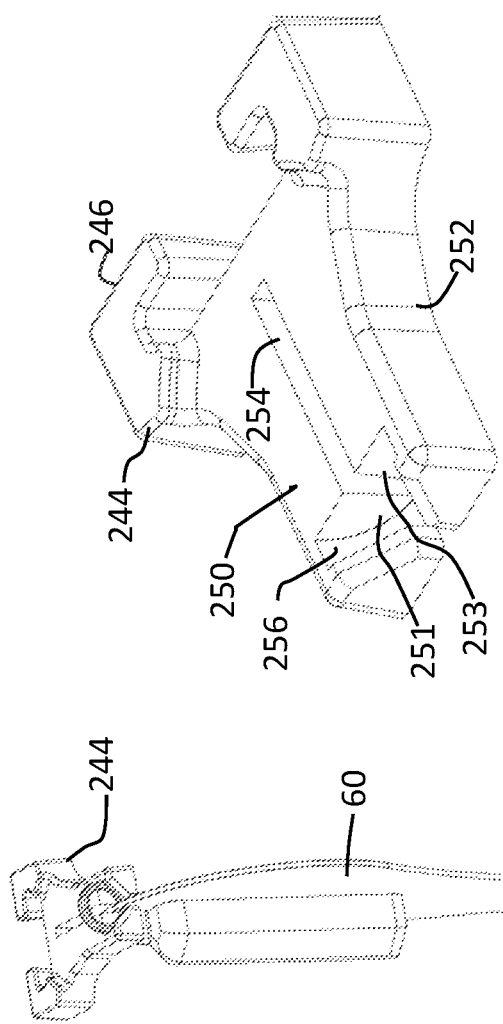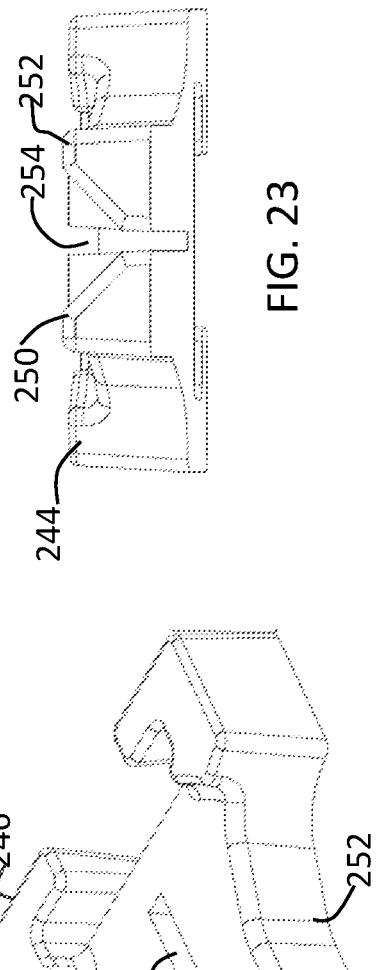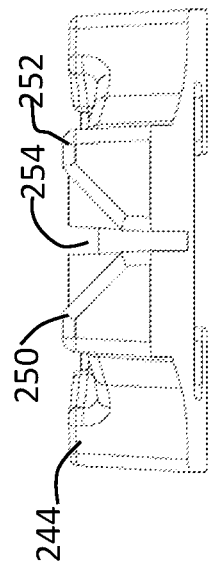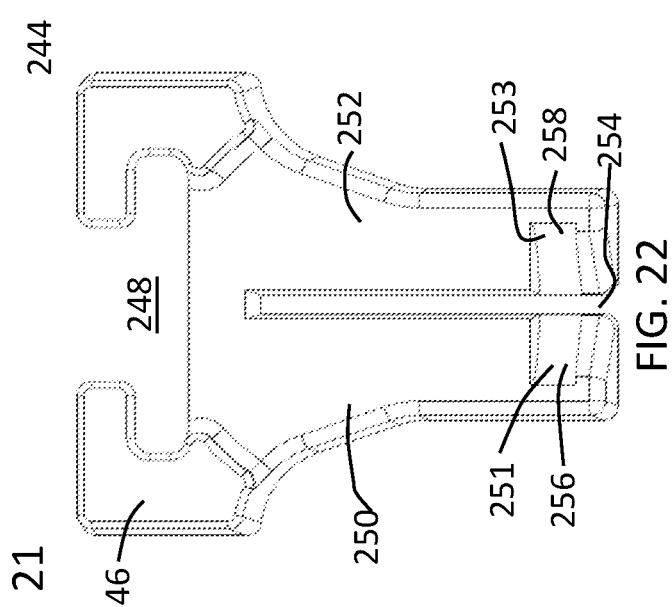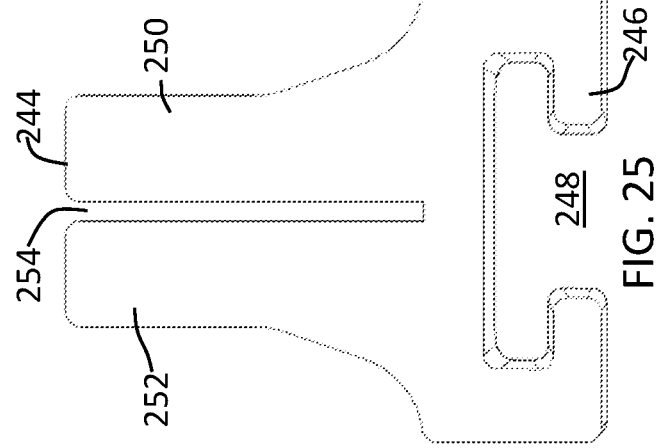

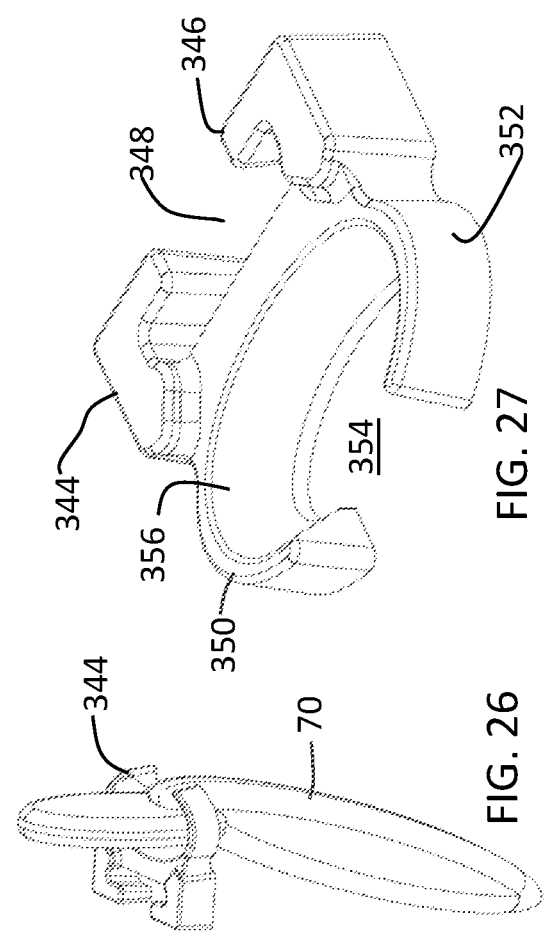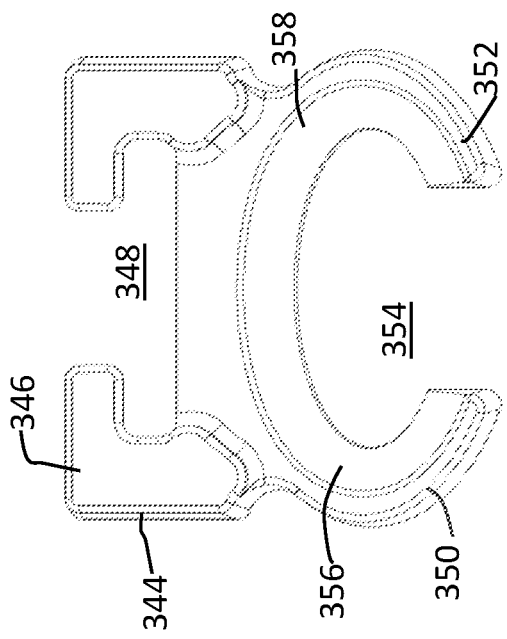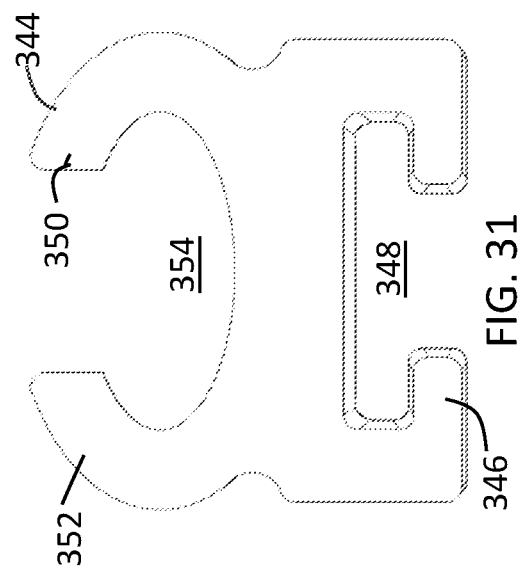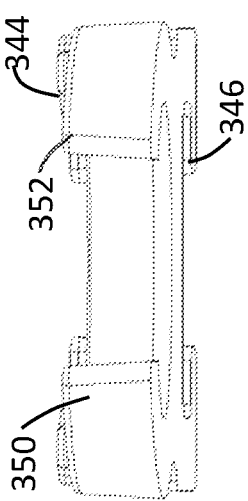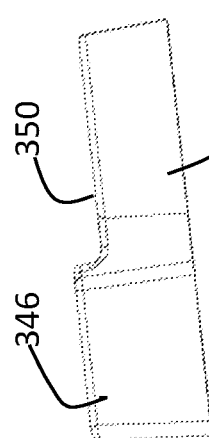

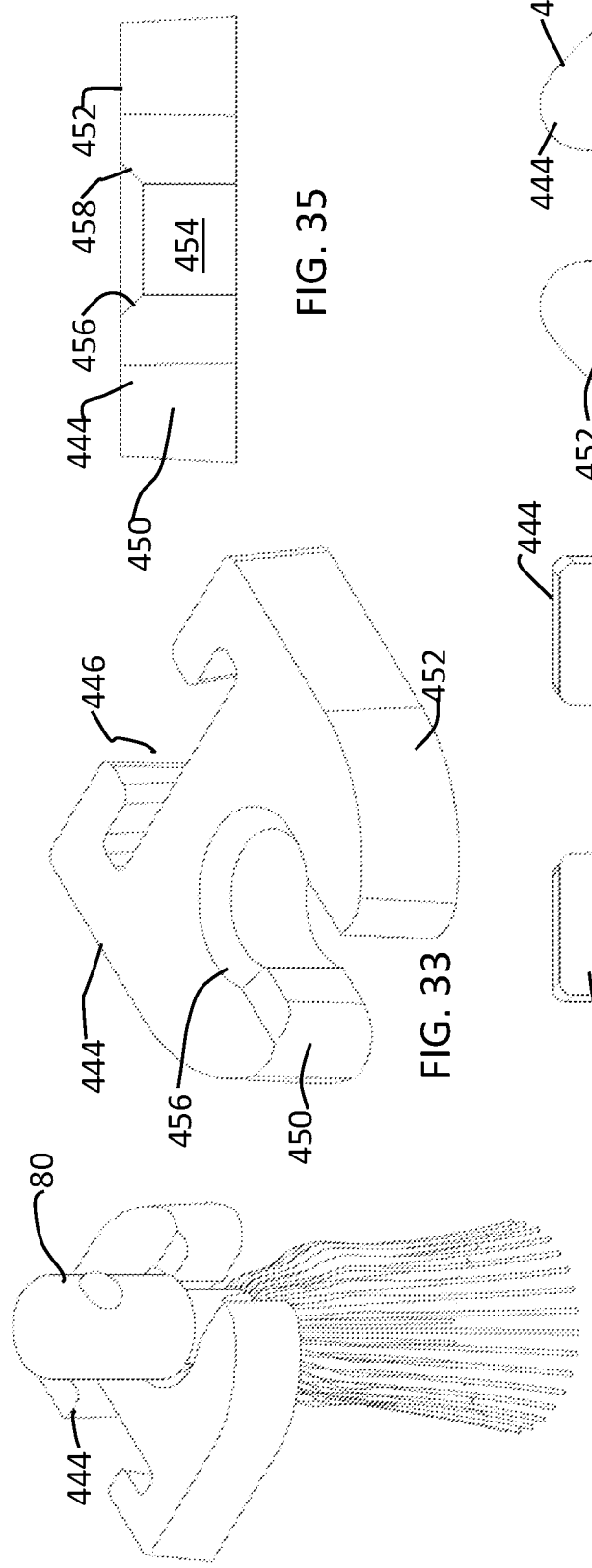

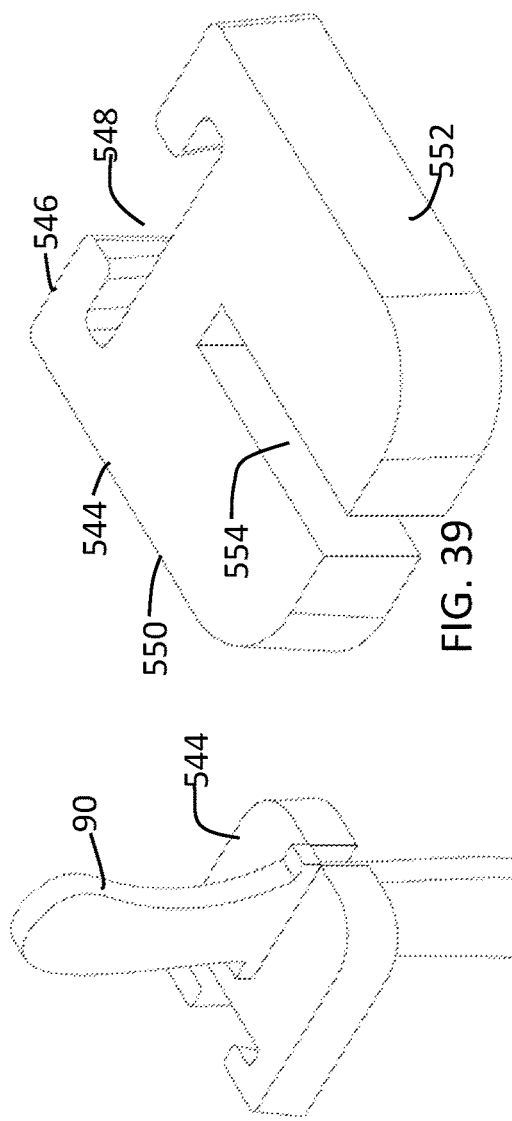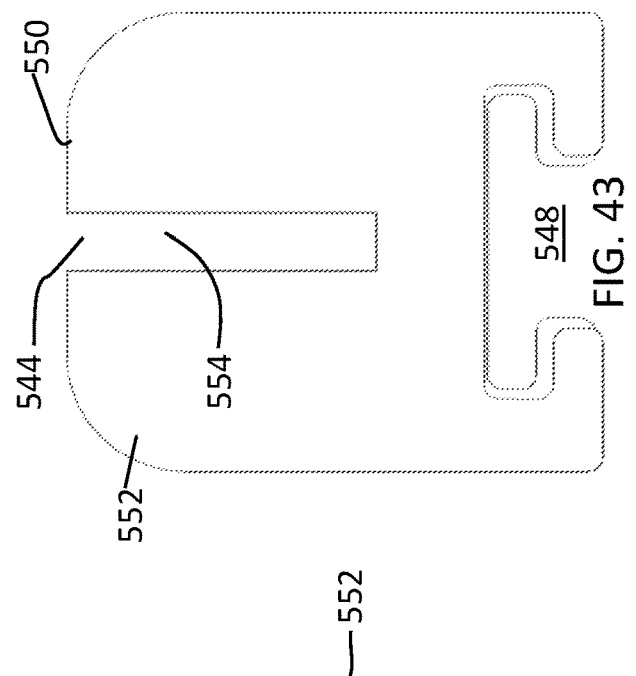

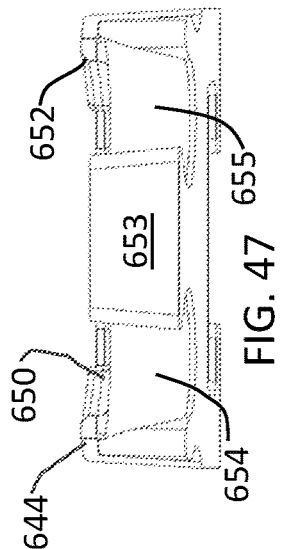
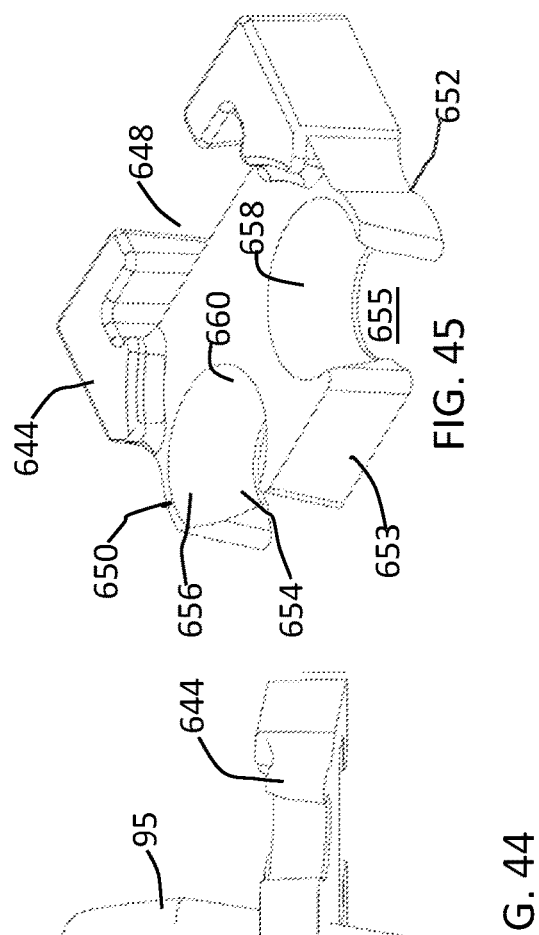

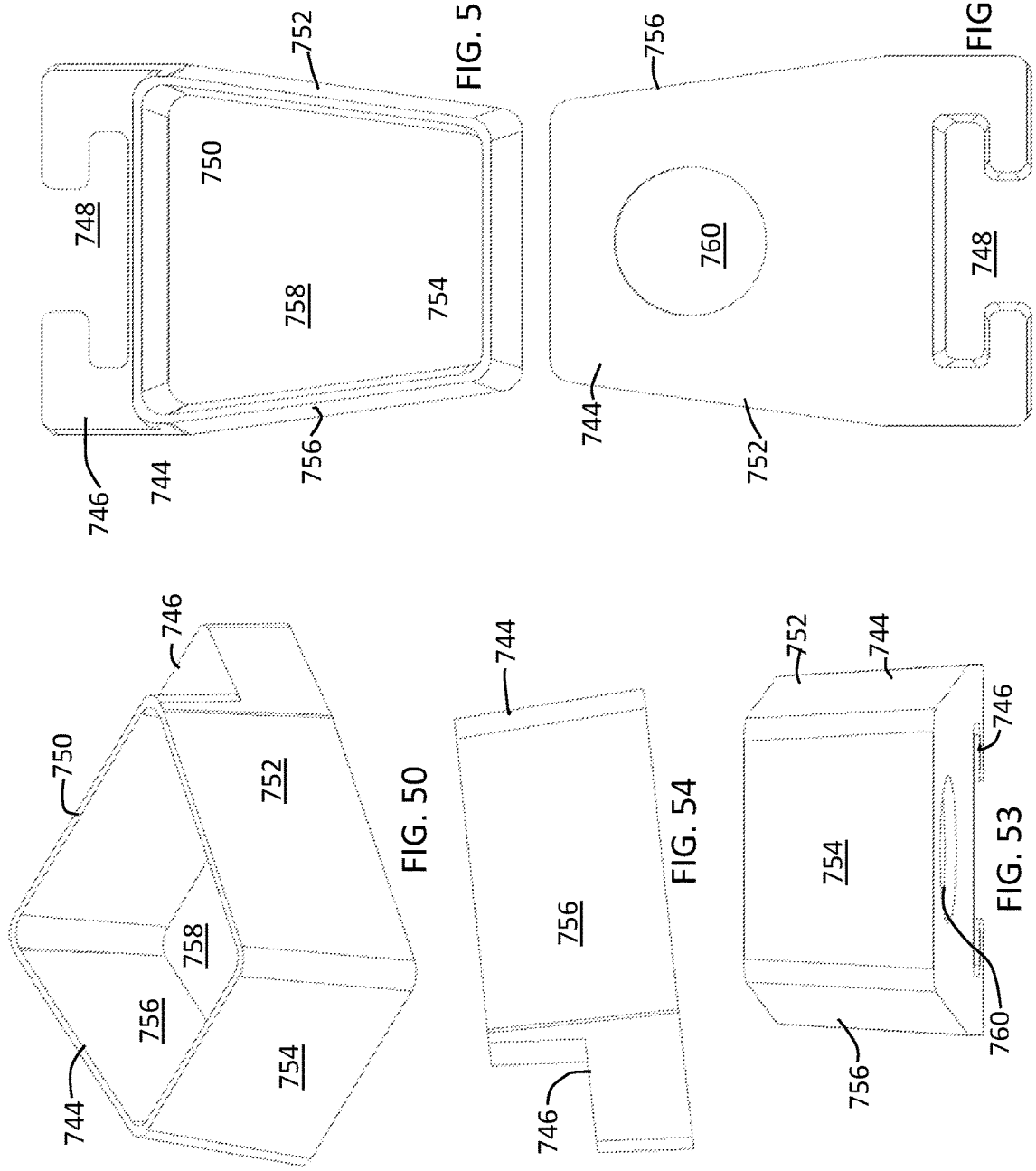

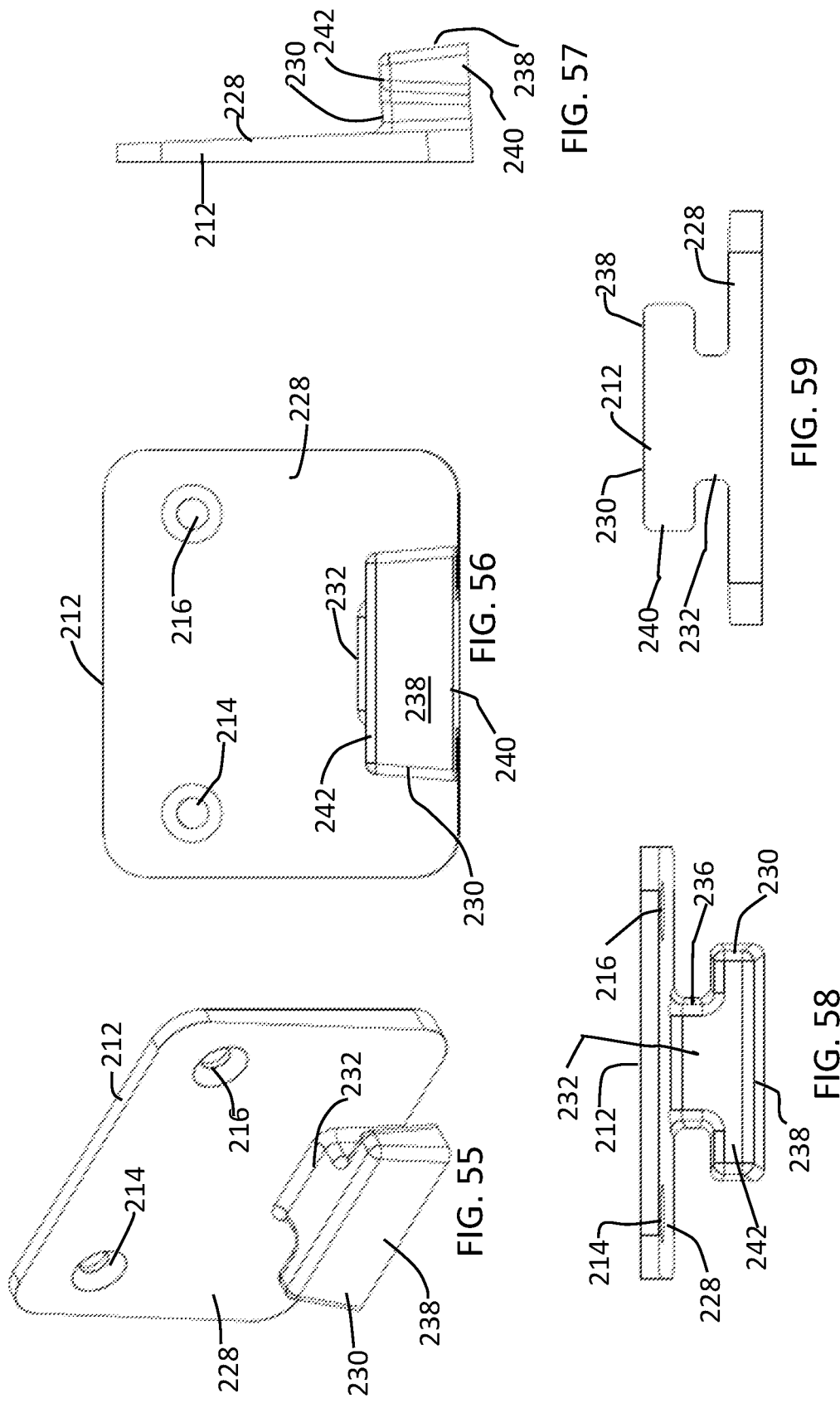

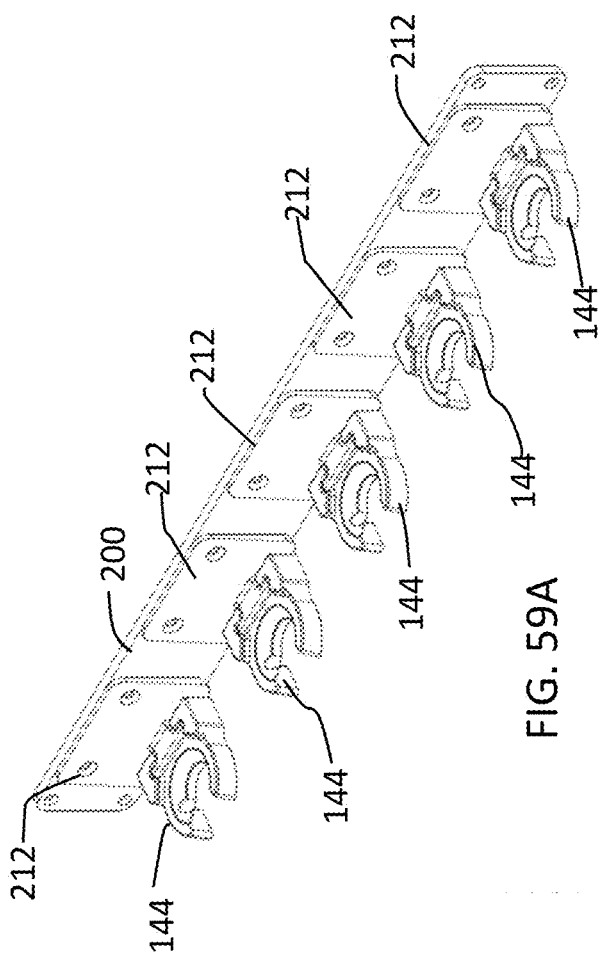
FIG. 59A
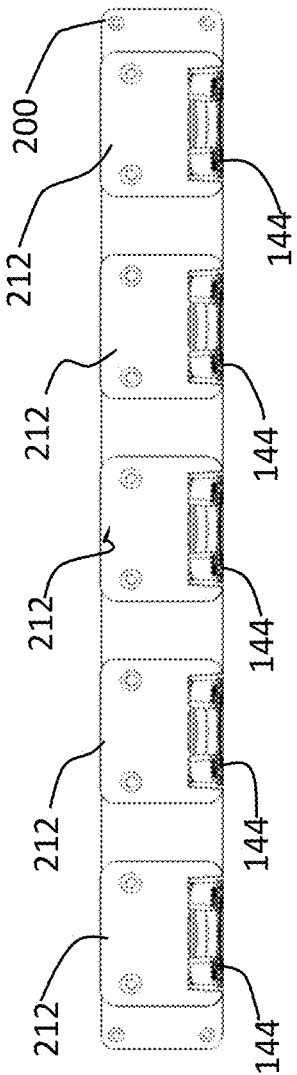
FIG. 59C
FIG. 59B

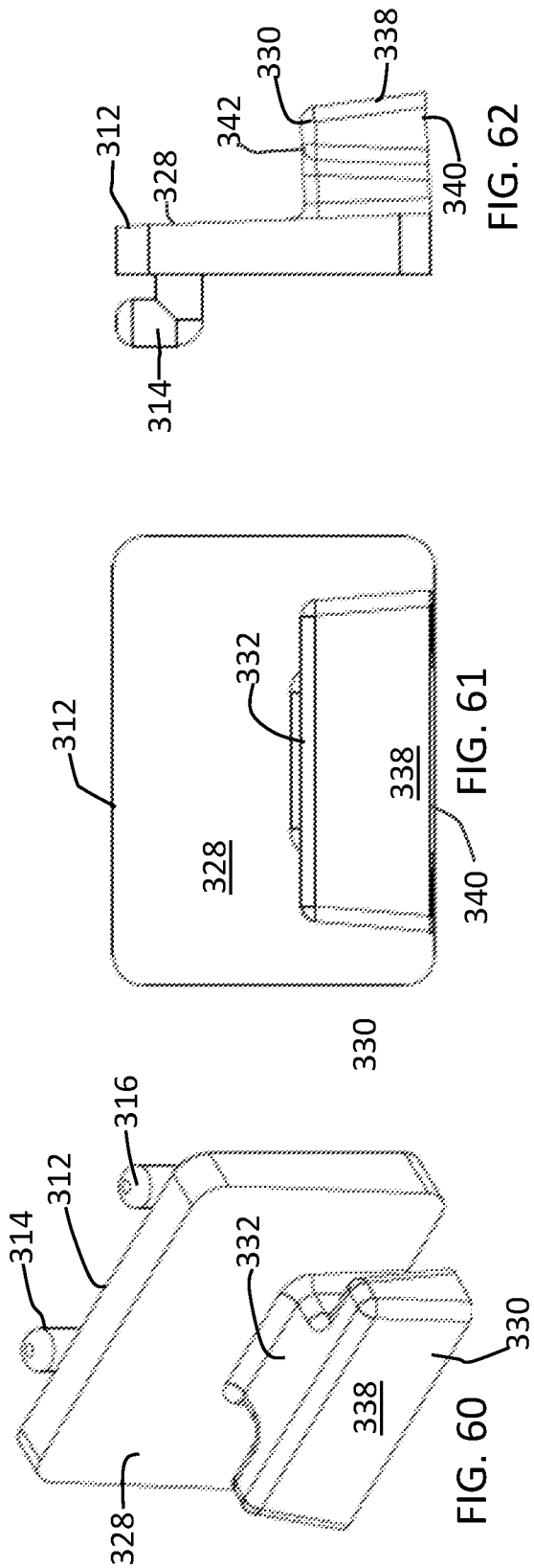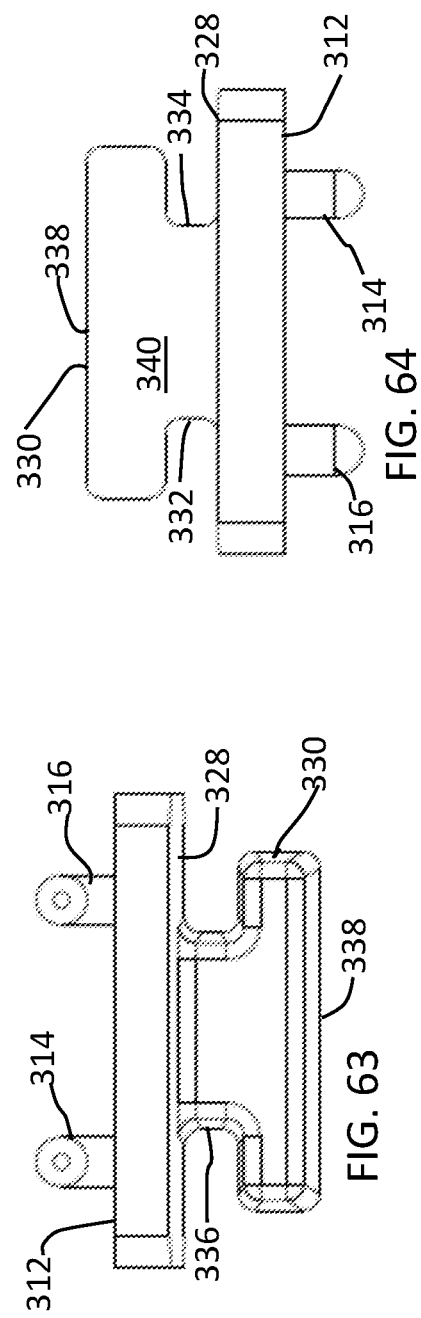

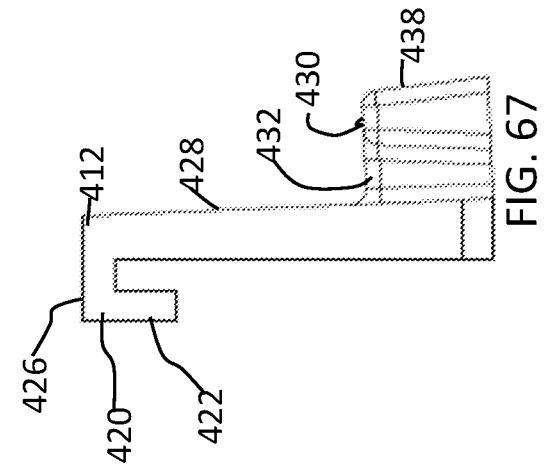
FIG. 67
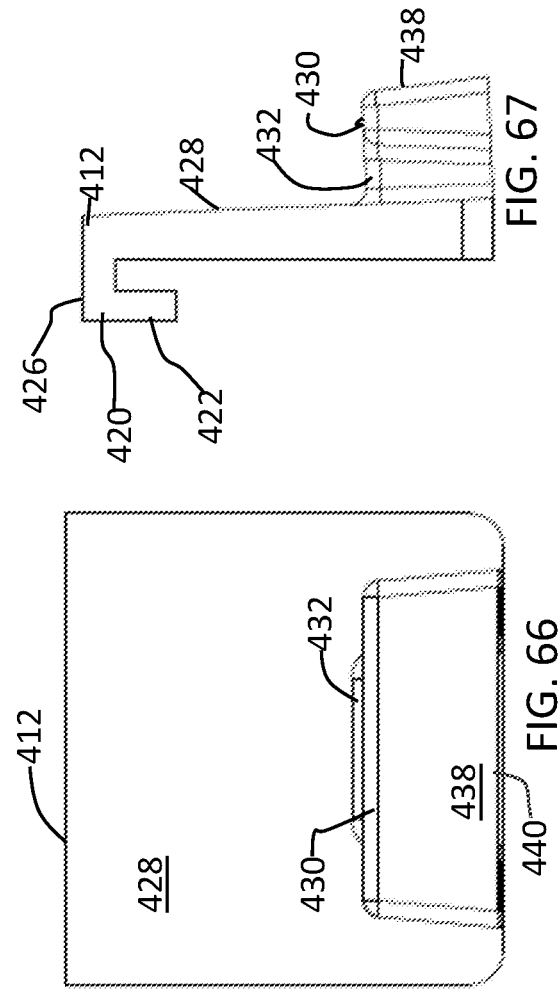
FIG. 66
FIG. 65
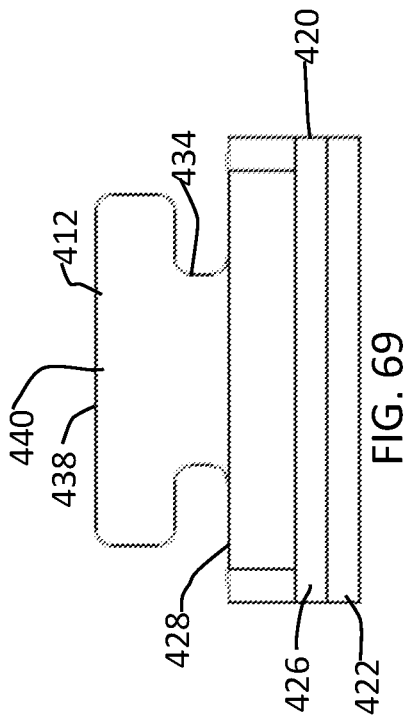
FIG. 69
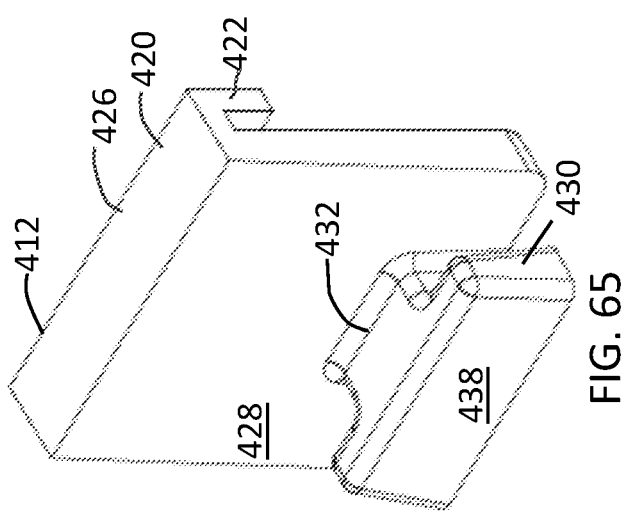
FIG. 68

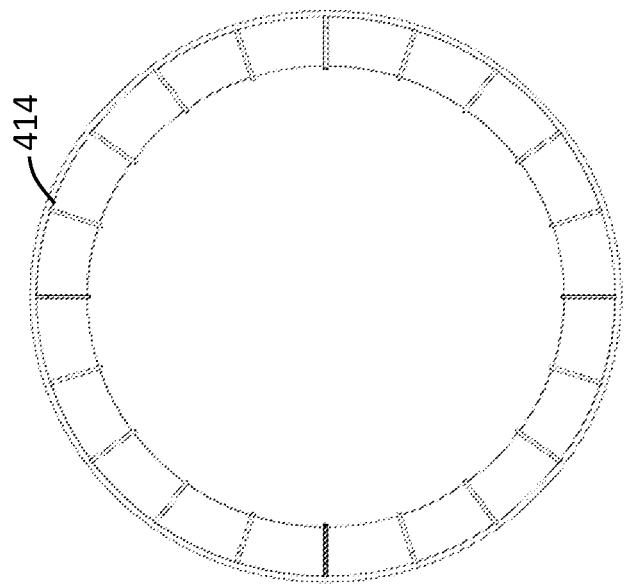
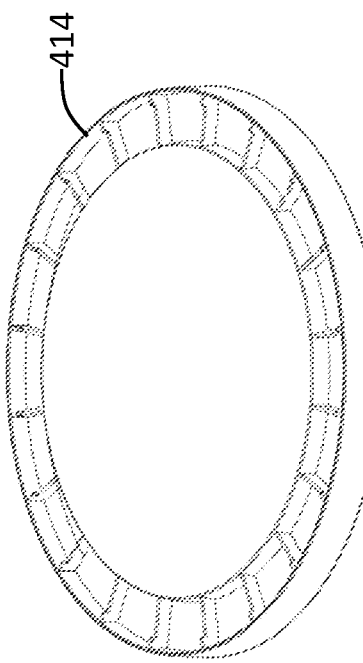
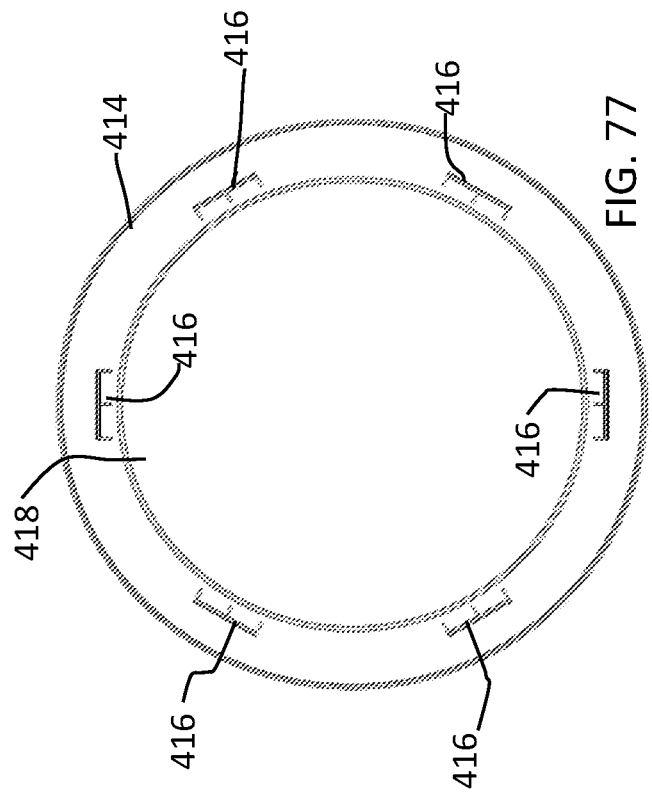

TACKLE CONTAINER AND KIT

BACKGROUND OF THE INVENTION

Field of the Invention

The present invention relates to a container that can store and transport fishing equipment, such as fishing tackle.

Description of the Related Art

Typically, serious fishermen have a large volume of lures and other tackle equipment that must be stored and transported from the home to a fishing site. Different fish are lured by different types and sizes of tackle, and a fisherman needs only to bring the tackle required for specific types of fish for which he is fishing.

It would be beneficial to provide a container that can be custom accessorized by individual fishermen to meet their needs in storing and transporting tackle.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a modular tackle container including a bucket having a sidewall. The sidewall has an inner wall, an outer wall, and a top surface connecting the inner wall and the outer wall. A plurality of brackets are configured to be removably supported on the top of the sidewall. Each of the plurality of brackets has an outer portion configured to face the outer wall, a top portion configured to engage the top surface, and an inner portion configured to face the inner wall. The inner portion includes a generally tee-shaped support. A holder is releasably attachable to the tee-shaped support. The holder has a receiver configured to slide onto the tee-shaped support such that the tee-shaped support vertically supports the holder.

In another embodiment, the present invention is a tackle kit comprising a bracket having a wall and a generally tee-shaped support extending outwardly from a front face of the wall and a first holder releasably attachable to the tee-shaped support. The first holder has a receiver configured to slide onto the tee-shaped support such that the tee-shaped support vertically supports the holder.

In still another embodiment, the present invention is a tackle kit comprising a plurality of brackets each bracket having a wall and a generally tee-shaped support extending outwardly from a front face of the wall. Aa first holder is releasably attachable to the tee-shaped support on a first of the plurality of brackets. The first holder has a first receiver configured to slide onto the tee-shaped support on the first of the plurality of brackets such that the tee-shaped support vertically supports the holder. A first curved finger portion extends away from the receiver, a second curved finger portion extends away from the receiver, and a first through slot is disposed between the first curved finger and the second curved finger. A second holder is releasably attachable to the tee-shaped support on a second of the plurality of brackets. The first holder has a receiver configured to slide onto the tee-shaped support on the second of the plurality of brackets such that the tee-shaped support vertically supports the holder. A first straight finger portion extends away from the receiver, a second straight finger portion extends away from the receiver, generally parallel to the first straight finger portion, and a second through slot is disposed between the first straight finger and the second straight finger.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 14 is a perspective view of a first lure retained in the holder of FIG. 4;

FIG. 15 is a perspective view of the holder of FIG. 4;

FIG. 16 is a top plan view of the holder of FIG. 4;

FIG. 17 is a front elevational view of the holder of FIG. 4;

FIG. 18 is a side elevational view of the holder of FIG. 4;

FIG. 19 is a bottom plan view of the holder of FIG. 4;

FIG. 20 is a perspective view of an alternative lure and a holder according to an alternative exemplary embodiment;

FIG. 21 is a perspective view of the holder of FIG. 20;

FIG. 22 is a top plan view of the holder of FIG. 20;

FIG. 23 is a front elevational view of the holder of FIG. 20;

FIG. 24 is a side elevational view of the holder of FIG. 20;

FIG. 25 is a bottom plan view of the holder of FIG. 20;

FIG. 26 is a perspective view of an alternative lure and a holder according to an alternative exemplary embodiment;

FIG. 27 is a perspective view of the holder of FIG. 26;

FIG. 28 is a top plan view of the holder of FIG. 26;

FIG. 29 is a front elevational view of the holder of FIG. 26;

FIG. 30 is a side elevational view of the holder of FIG. 26;

FIG. 31 is a bottom plan view of the holder of FIG. 26;

FIG. 32 is a perspective view of an alternative lure and a holder according to an alternative exemplary embodiment;

FIG. 33 is a perspective view of the holder of FIG. 32;

FIG. 34 is a top plan view of the holder of FIG. 32;

FIG. 35 is a front elevational view of the holder of FIG. 32;

FIG. 36 is a side elevational view of the holder of FIG. 32;

FIG. 37 is a bottom plan view of the holder of FIG. 32;

FIG. 38 is a perspective view of a knife and a holder according to an alternative exemplary embodiment;

FIG. 39 is a perspective view of the holder of FIG. 38;

FIG. 40 is a top plan view of the holder of FIG. 38;

FIG. 41 is a front elevational view of the holder of FIG. 38;

FIG. 42 is a side elevational view of the holder of FIG. 38;

FIG. 43 is a bottom plan view of the holder of FIG. 38;

FIG. 44 is a perspective view of an alternative lure and a holder according to an alternative exemplary embodiment;

FIG. 45 is a perspective view of the holder of FIG. 44;

FIG. 46 is a top plan view of the holder of FIG. 44;

FIG. 47 is a front elevational view of the holder of FIG. 44;

FIG. 48 is a side elevational view of the holder of FIG. 44;

FIG. 49 is a bottom plan view of the holder of FIG. 44;

FIG. 50 is a perspective view of a cup according to an alternative exemplary embodiment;

FIG. 51 is a top plan view of the holder of FIG. 50;

FIG. 52 is a bottom plan view of the holder of FIG. 50;

FIG. 53 is a front elevational view of the holder of FIG. 50;

FIG. 54 is a side elevational view of the holder of FIG. 50;

FIG. 55 is a perspective view of a bracket according to an alternative embodiment;

FIG. 56 is a front elevational view of the bracket of FIG. 55;

FIG. 57 is a side elevational view of the bracket of FIG. 55;

FIG. 58 is a top plan view of the bracket of FIG. 55;

FIG. 59 is a bottom plan view of the bracket of FIG. 55;

FIG. 59A is a perspective view of the bracket of FIG. 55 and holder of FIG. 4 attached to a rack;

FIG. 59B is a front elevational view of the bracket, holder, and rack of FIG. 59A;

FIG. 59C is a side elevational view of the bracket, holder, and rack of FIG. 59C;

FIG. 60 is a perspective view of a bracket according to an alternative embodiment;

FIG. 61 is a front elevational view of the bracket of FIG. 60;

FIG. 62 is a side elevational view of the bracket of FIG. 60;

FIG. 63 is a top plan view of the bracket of FIG. 60;

FIG. 64 is a bottom plan view of the bracket of FIG. 60;

FIG. 65 is a perspective view of a bracket according to an alternative embodiment;

FIG. 66 is a front elevational view of the bracket of FIG. 65;

FIG. 67 is a side elevational view of the bracket of FIG. 65;

FIG. 68 is a top plan view of the bracket of FIG. 65;

FIG. 69 is a bottom plan view of the bracket of FIG. 65;

FIG. 75 is a perspective view of an alternative lid for use with the kit of FIG. 1;

FIG. 76 is a top plan view of the lid of FIG. 75; and

FIG. 77 is a bottom plan view of the lid of FIG. 75.

DETAILED DESCRIPTION

Figure 2:
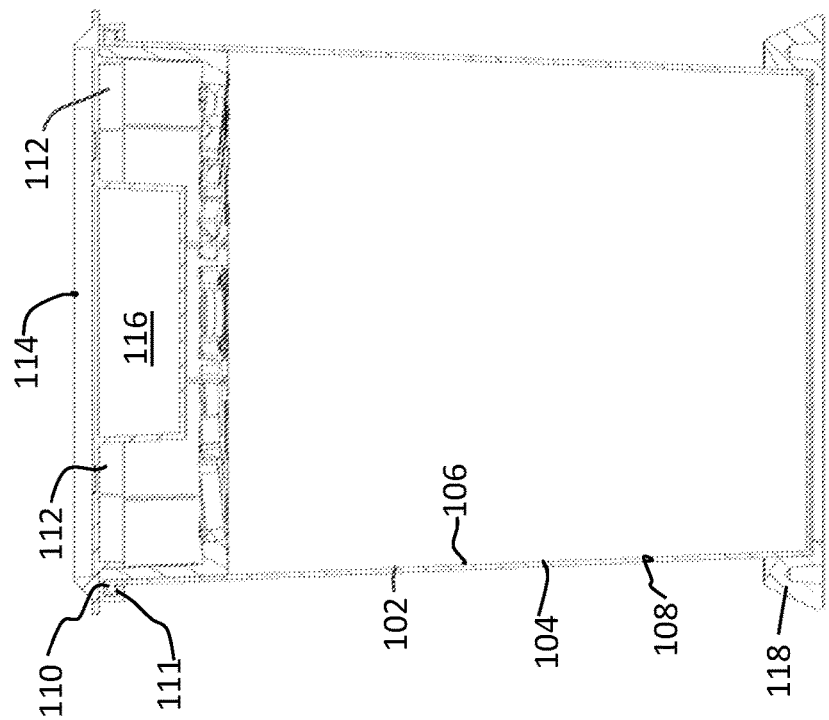
FIG. 2 is a side elevational view of the kit of FIG. 1 fully assembled.
Figure 1:
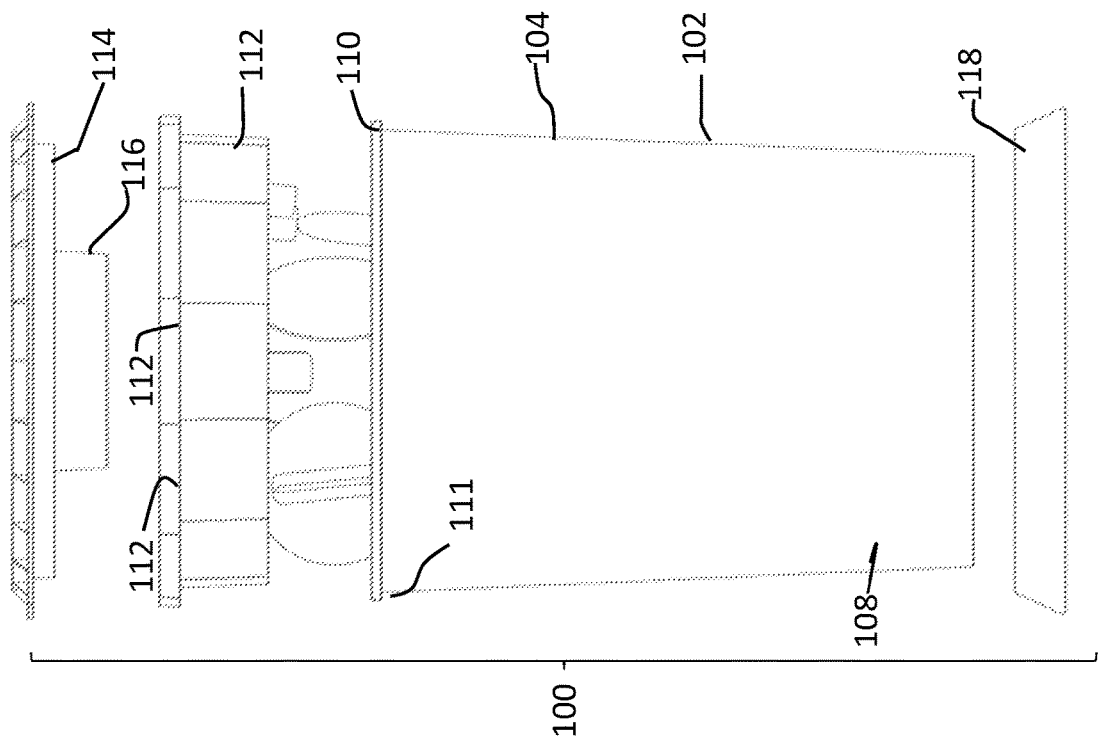
FIG. 1 is a side elevational exploded view of a modular fishing lure storage and transport kit ("kit") according to an exemplary embodiment of the present invention.
Figure 4:
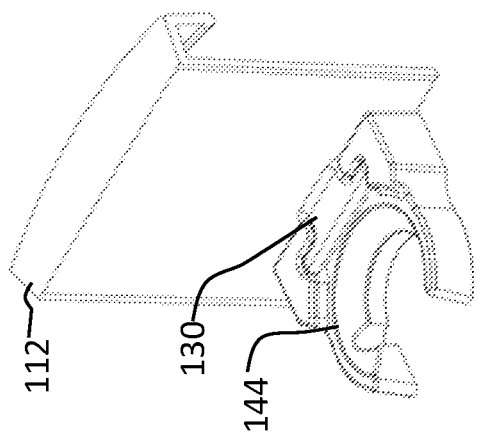
FIG. 4 is a perspective view of a bracket and holder for use with the kit of FIG. 1.
Figure 3:
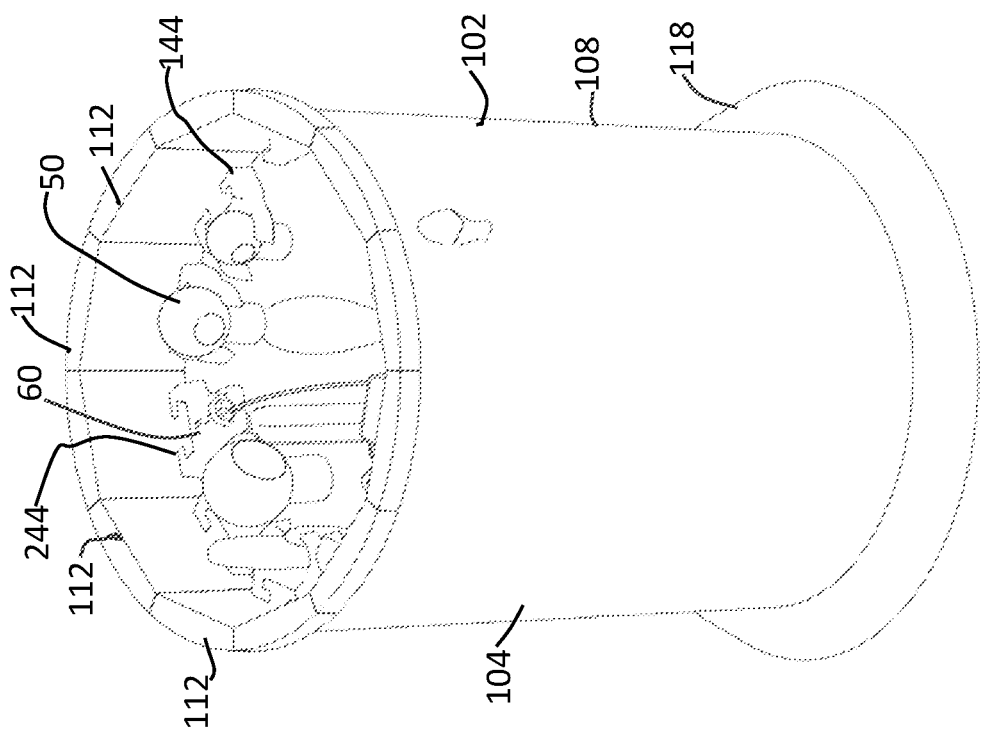
FIG. 3 is a perspective view of the kit of FIG. 2 with the lid removed.
Figure 7:
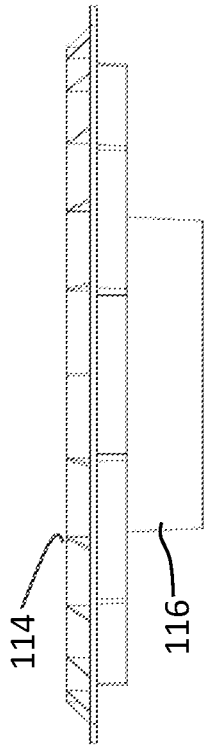
FIG. 7 is a side elevational view of the lid of FIG. 5.
Figure 8:
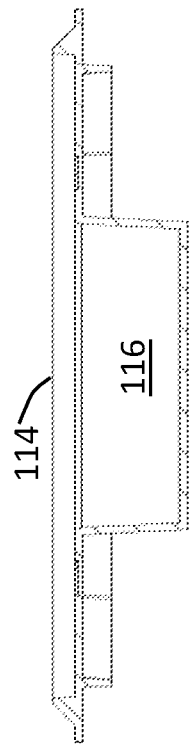
FIG. 8 is a sectional view of the lid of FIG. 5, taken along lines 8-8 of FIG. 6.
Figure 5:
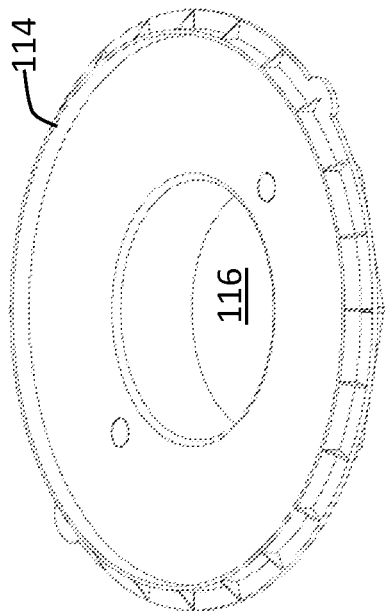
FIG. 5 is a perspective view of a lid used with the kit of FIG. 1.
Figure 6:
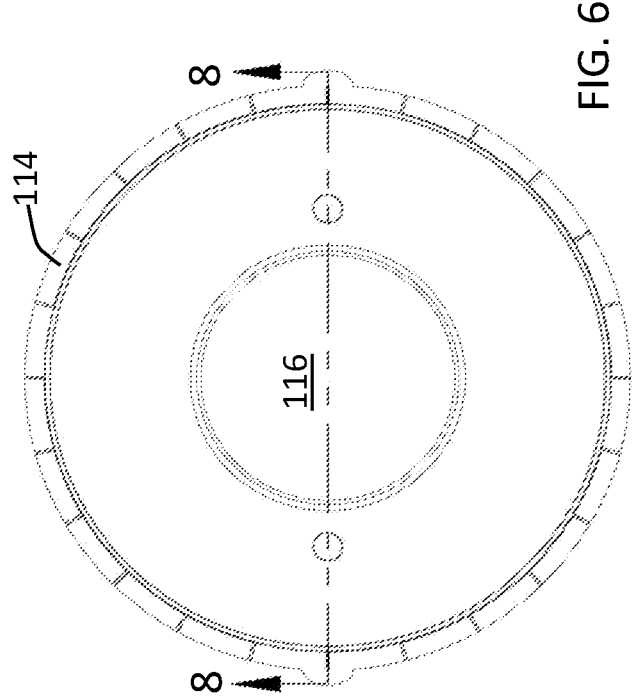
FIG. 6 is a top plan view of the lid of FIG. 5.
Figure 11:
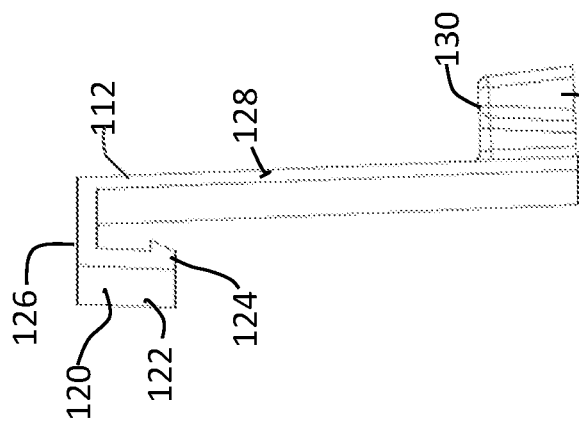
FIG. 11 is a side elevational view of the bracket of FIG. 9.
Figure 13:
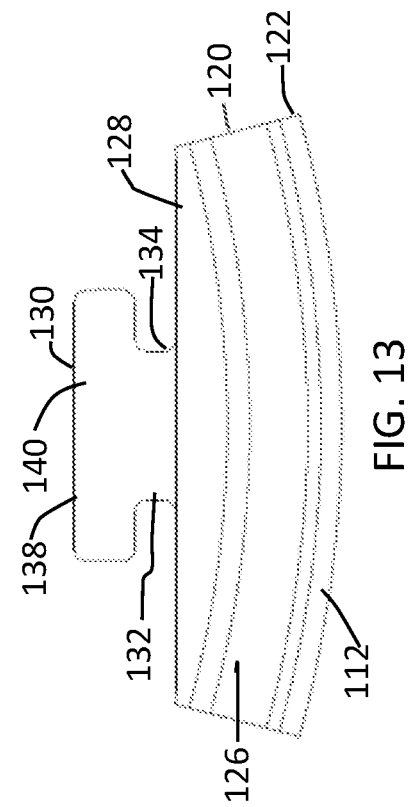
FIG. 13 is a bottom plan view of the bracket of FIG. 9.
Figure 10:
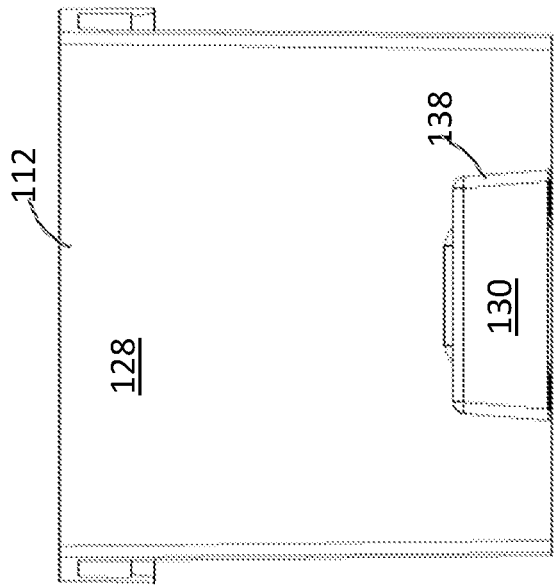
FIG. 10 is a front elevational view of the bracket of FIG. 9.
Figure 9:
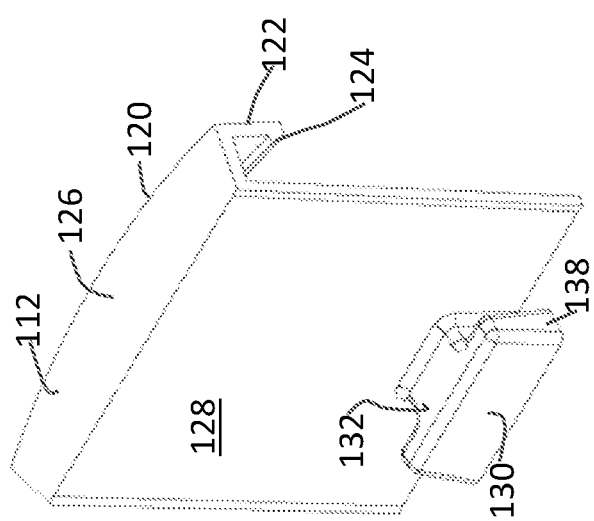
FIG. 9 is a perspective view of the bracket of FIG. 4.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

A modular fishing lure storage and transport kit 100 ("kit 100") according to an exemplary embodiment of the present invention is shown in FIGS. 1-8. Kit 100 can vary in size and includes modular holder assemblies for supporting lures, tools, and other fishing equipment. For example, a standard version of kit 100 can include twelve brackets with twelve interchangeable holders. Alternatively, a large version of kit 100 can include twelve brackets and more than twelve interchangeable holders to allow a fisherman to select which holders to use for a particular fishing trip.

Kit 100 includes a bucket 102 having a sidewall 104. Sidewall 104 includes an inner wall 106 that defines an inner perimeter of bucket 102 and an outer wall 108. In an exemplary embodiment, sidewall 104 is generally circular, although those skilled in the art will recognize that sidewall can be other shapes, such as generally rectangular.

A top surface 110 connects inner wall 106 and outer wall 108 to each other and serves as a support for each of a plurality of brackets 112 that are configured to be removably supported on top surface 110 of sidewall 104. Top surface 110 can include a lip that overhangs outer wall 108. In an exemplary embodiment, twelve brackets 112 can be installed around the perimeter of top surface 110, with each bracket traversing an arc of about 20 degrees. Those skilled in the art will recognize the more than twelve smaller brackets or less than twelve larger brackets can also be used.

A lid 114 is configured to fit over bucket 102 when the plurality of brackets 112 are supported on the top surface 110 of sidewall 104. Lid 114 includes a recessed central storage portion 116 that is configured to fit within a perimeter of bucket 102 defined by the plurality of brackets 112. Lid 114 is constructed to allow a second bucket (not shown) to be able to be stacked on top of lid 114.

Optionally, a stabilizing rubber base 118 can be provided to provide stability to bucket 102 to reduce the likelihood of bucket 102 tipping over, particularly when kit 100 is used on a boat.

Figure 12:
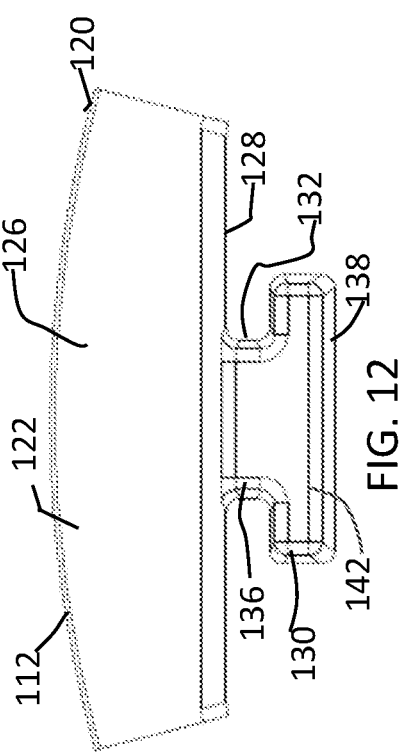
FIG. 12 is a top plan view of the bracket of FIG. 9.
Figure 72:
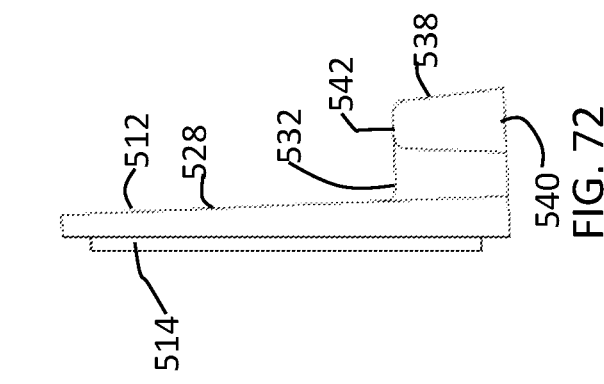
FIG. 72 is a side elevational view of the bracket of FIG. 70.
Figure 74:
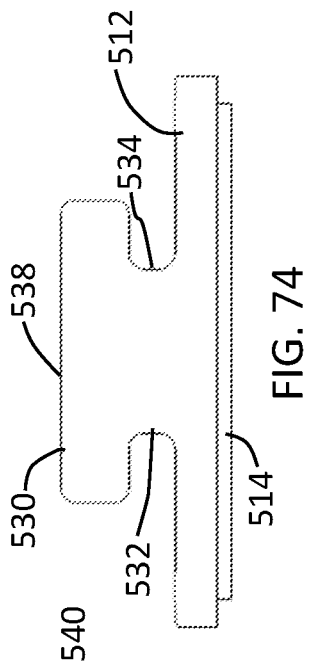
FIG. 74 is a bottom plan view of the bracket of FIG. 70.
Figure 71:
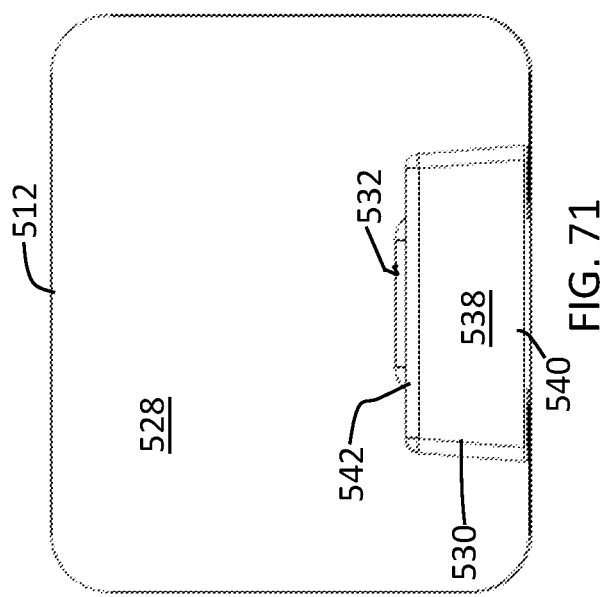
FIG. 71 is a front elevational view of the bracket of FIG. 70.
Figure 73:
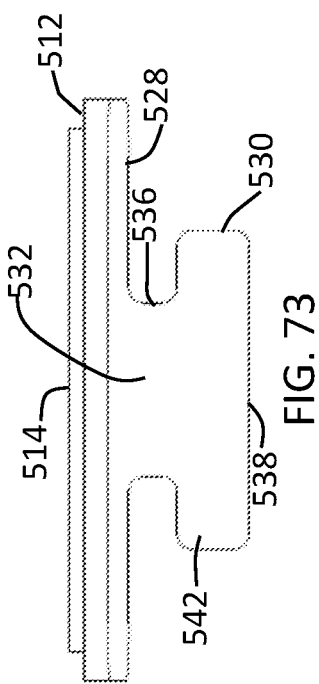
FIG. 73 is a top plan view of the bracket of FIG. 70.
Figure 70:
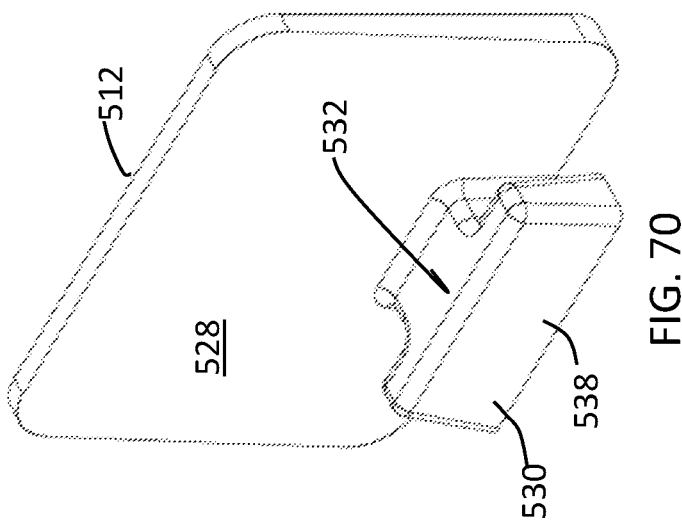
FIG. 70 is a perspective view of a bracket according to an alternative embodiment.

Referring now to FIGS. 9-13, a bracket 112 that can be used with bucket 102 is shown. Each bracket 112 includes a hook portion 120 that includes an outer portion 122 configured to face outer wall 108. A lip 124 can be provided to snap underneath lip 111 on top surface 110 of sidewall 104 to releasably secure lid 114 to bucket 102. When bracket 112 is used with a round bucket, outer portion 122 is curved, as shown in FIG. 12. The curvature of outer portion 122 accommodates the curvature of wall 104 of bucket 102.

Hook portion 120 of bracket 112 also includes a top portion 126 configured to engage top surface 110 and to support bracket 112 on bucket 102. Hook portion 120 further includes an inner portion 128 that is configured to face inner wall 106. Inner portion 128 forms a wall such that top portion 126 is generally orthogonal to the wall of inner portion 128 and outer portion 122 is connected to and extends generally orthogonally to top portion 126. Inner portion 128 also includes a generally tee-shaped support 130 extending outwardly therefrom.

Tee-shaped support 130 includes a base 132 that is tapered with a trapezoidal cross section such that a bottom end 134 of the base 132 is larger than a top end 136 of base 132. Tee-shaped support 130 further comprises a bar 138 extending from and generally orthogonally to base 132. Bar 138 is tapered with a trapezoidal cross section such that a bottom end 140 of bar 138 is larger than a top end 142 of bar 138.

Referring now to FIGS. 14-19, a first exemplary embodiment of a holder 144 that is releasably attachable to tee-shaped support 130 is shown. Holder 144 can be used to retain a mojo lure 50. Alternative embodiments of holders will be described later herein to hold other lures, tools, and equipment on bracket 112. Holder 144 has a receiver 146 configured to slide onto tee-shaped support 130 such that tee-shaped support 130 vertically supports holder 144. As can be seen in FIGS. 16 and 19, receiver 146 defines a gap 148 that approximates the shape of tee-shaped support 130. The tapers of base 132 and bar 138 frictionally engage the walls of receiver 146 that define gap 148.

Holder 144 also includes a first curved finger portion 150 that extends away from receiver 146 and a second curved finger portion 152 that also extends away from receiver 146. Each curved finger portion 150, 152 also includes a notch 151, 153, respectively, formed therein. A first through slot 154 is disposed between first curved finger 150 and second curved finger 152. Each finger 150, 152 includes a tapered seating surface 156, 158, respectively facing the other finger 152, 150.

Notches 151, 153, through slot 154, and tapered seating surfaces 156, 158 are sized to specifically accept a mojo lure 50 or other similarly sized and shaped lure. Tapered seating surfaces 156, 158 can "cup" lure 50 and reduce movement of lure 50 in holder 144. Lure 50 stays fixed in holder 144 and prevents lure 50 from swinging and hitting adjacent lures. The cupping configuration also allows lure 50 to be stored upright. FIG. 18 shows holder 144 tilted at an angle relative to the bottom of the drawing sheet. The angle also helps to keep lure 50 seated on holder 144.

Additionally, bracket 112 and holder 144 extend outwardly from inner wall 106 of bucket 102 sufficiently far so that hooks (not shown) on lure 50 can face radially outwardly of bucket 102, toward inner wall 106, so that a user putting his hand into bucket 102 will be less likely to inadvertently stick himself with a hook on lure 50.

While holder 144 is configured to receive and retain mojo lure 50, other brackets are provided in kit 100 that can receive and retain other lures and fishing tools. For example, FIGS. 20-25 show a holder 244 that can be used to receive and retain a bunker spoon lure 60. Similar to holder 144, holder 244 is releasably attachable to tee-shaped support 130 on a second bracket 112. Holder 244 has a receiver 246 configured to slide onto tee-shaped support 130 such that tee-shaped support 130 vertically supports holder 244. As can be seen in FIGS. 22 and 25, receiver 246 defines a gap 248 that approximates the shape of tee-shaped support 130. The tapers of base 132 and bar 138 frictionally engage the walls of receiver 246 that define gap 248.

Holder 244 also includes a first linear finger portion 250 that extends away from receiver 246 and a second linear finger portion 252 that also extends away from receiver 246. Each linear finger portion 250, 252 also includes a notch 251, 253, respectively, formed therein. A first through slot 254 is disposed between first linear finger 250 and second linear finger 252. Each notch 251, 253 includes a tapered seating surface 256, 258, respectively facing the other notch 253, 251. Whereas through slot 154 is generally curved in shape to accommodate mojo lure 50, through slot 254 is generally linear in shape to accommodate bunker spoon lure 60.

Notches 251, 253, through slot 254, and tapered seating surfaces 256, 258 are sized to specifically accept a bunker spoon lure 60 or other similarly sized and shaped lure. Tapered seating surfaces 256, 258 can "cup" lure 60 and reduce movement of lure 60 in holder 244. Lure 60 stays fixed in holder 244 and prevents lure 60 from swinging and hitting adjacent lures. The cupping configuration also allows lure 60 to be stored upright. FIG. 24 shows holder 244 tilted at an angle relative to the bottom of the drawing sheet. The angle also helps to keep lure 60 seated on holder 244.

Additionally, bracket 112 and holder 244 extend outwardly from inner wall 106 of bucket 102 sufficiently far so that hooks (not shown) on lure 60 can face radially outwardly of bucket 102, toward inner wall 106, so that a user putting his hand into bucket 102 will be less likely to inadvertently stick himself with a hook on lure 60.

FIGS. 26-31 show a holder 344 that can be used to receive and retain a bunker plug lure 70. Similar to holder 144, holder 344 is releasably attachable to tee-shaped support 130 on a second bracket 112. Holder 344 has a receiver 346 configured to slide onto tee-shaped support 130 such that tee-shaped support 130 vertically supports holder 344. As can be seen in FIGS. 28 and 31, receiver 346 defines a gap 348 that approximates the shape of tee-shaped support 130. The tapers of base 132 and bar 138 frictionally engage the walls of receiver 346 that define gap 348.

Holder 344 also includes a first curved finger portion 350 that extends away from receiver 346 and a second curved finger portion 352 that also extends away from receiver 346. A first through slot 354 is disposed between first curved finger 350 and second curved finger 352. Each finger 350, 352 includes a tapered seating surface 356, 358, respectively facing the other finger 352, 350.

Through slot 354 and tapered seating surfaces 356, 358 are sized to specifically accept a plug lure 70 or other similarly sized and shaped lure. Tapered seating surfaces 356, 358 can "cup" lure 70 and reduce movement of lure 70 in holder 344. Lure 70 stays fixed in holder 344 and prevents lure 70 from swinging and hitting adjacent lures. The cupping configuration also allows lure 70 to be stored upright. FIG. 30 shows holder 344 tilted at an angle relative to the bottom of the drawing sheet. The angle also helps to keep lure 70 seated on holder 344.

Additionally, bracket 112 and holder 344 extend outwardly from inner wall 106 of bucket 102 sufficiently far so that hooks (not shown) on lure 70 can face radially outwardly of bucket 102, toward inner wall 106, so that a user putting his hand into bucket 102 will be less likely to inadvertently stick himself with a hook on lure 70.

FIGS. 32-37 show a holder 444 that can be used to receive and retain a trolling lure 80. Similar to holder 144, holder 444 is releasably attachable to tee-shaped support 130 on a second bracket 112. Holder 444 has a receiver 446 configured to slide onto tee-shaped support 130 such that tee-shaped support 130 vertically supports holder 444. As can be seen in FIGS. 34 and 37, receiver 446 defines a gap 448 that approximates the shape of tee-shaped support 130. The tapers of base 132 and bar 138 frictionally engage the walls of receiver 446 that define gap 448.

Holder 444 also includes a first curved finger portion 450 that extends away from receiver 446 and a second curved finger portion 452 that also extends away from receiver 446. A first through slot 454 is disposed between first curved finger 450 and second curved finger 452. Each finger 450, 452 includes a tapered seating surface 456, 458, respectively facing the other finger 452, 450.

Through slot 454 and tapered seating surfaces 456, 458 are sized to specifically accept a trolling lure 80 or other similarly sized and shaped lure. Tapered seating surfaces 456, 458 can "cup" lure 80 and reduce movement of lure 80 in holder 444. Lure 80 stays fixed in holder 444 and prevents lure 80 from swinging and hitting adjacent lures. The cupping configuration also allows lure 80 to be stored upright. FIG. 36 shows holder 444 tilted at an angle relative to the bottom of the drawing sheet. The angle also helps to keep lure 80 seated on holder 444.

Additionally, bracket 112 and holder 444 extend outwardly from inner wall 106 of bucket 102 sufficiently far so that hooks (not shown) on lure 80 can face radially outwardly of bucket 102, toward inner wall 106, so that a user putting his hand into bucket 102 will be less likely to inadvertently stick himself with a hook on lure 80.

FIGS. 38-43 show a holder 544 that can be used to receive and retain a knife 90. Similar to holder 144, holder 544 is releasably attachable to tee-shaped support 130 on a second bracket 112. Holder 544 has a receiver 546 configured to slide onto tee-shaped support 130 such that tee-shaped support 130 vertically supports holder 544. As can be seen in FIGS. 40 and 43, receiver 546 defines a gap 548 that approximates the shape of tee-shaped support 130. The tapers of base 132 and bar 138 frictionally engage the walls of receiver 546 that define gap 548.

Holder 544 also includes a first linear finger portion 550 that extends away from receiver 546 and a second linear finger portion 552 that also extends away from receiver 546. A first through slot 554 is disposed between first linear finger 550 and second linear finger 552. Through slot 554 is sized to specifically accept a knife 90 or other similarly sized and shaped tool.

FIGS. 44-49 show a holder 644 that can be used to receive and retain a jig lure 95. Similar to holder 144, holder 644 is releasably attachable to tee-shaped support 130 on a second bracket 112. Holder 644 has a receiver 646 configured to slide onto tee-shaped support 130 such that tee-shaped support 130 vertically supports holder 644. As can be seen in FIGS. 46 and 49, receiver 646 defines a gap 648 that approximates the shape of tee-shaped support 130. The tapers of base 132 and bar 138 frictionally engage the walls of receiver 646 that define gap 648.

Holder 644 also includes a first curved finger portion 650 that extends away from receiver 646 and a second curved finger portion 652 that also extends away from receiver 646. A first through slot 654 is disposed between first curved finger 650 and second curved finger 652. A second through slot 655 is also disposed between the first and second fingers 650, 652, with a central finger 653 separating the first through slot 654 and the second through slot 655 so that two jig lures 95 can be received and retained by holder 644. Each finger 650, 652, 653 includes a tapered seating surface 656, 658, 660, respectively, facing opposing finger 653, 652, 650.

Through slots 654, 655 and tapered seating surfaces 656, 658, 660 are sized to specifically accept a jig lure 95 or other similarly sized and shaped lure. Tapered seating surfaces 656, 658, 660 can "cup" lure 95 and reduce movement of lure 95 in holder 644. Lure 95 stays fixed in holder 644 and prevents lure 95 from swinging and hitting adjacent lures. The cupping configuration also allows lure 95 to be stored upright. FIG. 48 shows holder 644 tilted at an angle relative to the bottom of the drawing sheet. The angle also helps to keep lure 95 seated on holder 644.

FIGS. 50-54 show a holder 744 that is a cup. Similar to holder 144, holder 744 is releasably attachable to tee-shaped support 130 on a second bracket 112. Holder 744 has a receiver 746 configured to slide onto tee-shaped support 130 such that tee-shaped support 130 vertically supports holder 744. As can be seen in FIGS. 51 and 52, receiver 746 defines a gap 748 that approximates the shape of tee-shaped support 130. The tapers of base 132 and bar 138 frictionally engage the walls of receiver 746 that define gap 748.

Holder 744 also a plurality of walls 750, 752, 754, 746 that form a perimeter. While holder 744 is shown in FIG. 51 as being generally trapezoidal in shape, those skilled in the art will recognize that holder 744 can have more or less than four sides 750-756 and can be other than trapezoidal in shape. A bottom 758 extends within the bottom perimeter of walls 750-756 to form a cup. Recess 760 is sized to retain a magnet (not shown) to retain magnetically attractive tools and equipment that can be placed inside holder 744. FIG. 54 shows holder 744 tilted at an angle relative to the bottom of the drawing sheet. The angle also helps to keep items stored in holder 744 from falling out.

While holders 144, 244, 344, 444, 544, 644, 744 can be used with bracket 112, other brackets can also be used with holders 144, 244, 344, 444, 544, 644, 744. Referring to FIGS. 55-59, a bracket 212 has replaced outer portion 122 and top portion 126 of bracket 112 with a pair of through holes 214, 216 formed in wall of inner portion 228 so that bracket 212 can be screw-mounted to a wall (not shown) or to strip 200, shown in FIGS. 59A, 59B, and 59C.

Similar to bracket 112, bracket 212 includes a tee-shaped support 230 that includes a base 232 that is tapered with a trapezoidal cross section such that a bottom end 234 of the base 232 is larger than a top end 236 of base 232. Tee-shaped support 230 further comprises a bar 238 extending from and generally orthogonally to base 232. Bar 238 is tapered with a trapezoidal cross section such that a bottom end 240 of bar 238 is larger than a top end 242 of bar 238.

Referring to FIGS. 60-64, a bracket 312 has replaced outer portion 122 and top portion 126 of bracket 112 with a pair of through rear prongs 314, 316 formed in the rear wall of inner portion 328 so that bracket 312 can be hung on a pegboard, similar to the pegboard disclosed in U.S. Pat. No. 10,137,916 (the '916 patent), which is incorporated herein by reference in its entirety.

Similar to bracket 112, bracket 312 includes a tee-shaped support 330 that includes a base 332 that is tapered with a trapezoidal cross section such that a bottom end 334 of the base 332 is larger than a top end 336 of base 332. Tee-shaped support 330 further comprises a bar 338 extending from and generally orthogonally to base 332. Bar 338 is tapered with a trapezoidal cross section such that a bottom end 340 of bar 338 is larger than a top end 342 of bar 338.

Referring to FIGS. 65-69, a bracket 412 has replaced outer portion 122 and top portion 126 of bracket 412 with a hook portion 420 that includes an outer portion 422 configured to face outer wall 108. Outer portion 422 is straight, as shown in FIG. 69 to accommodates the use of bracket 412 on a container (not shown) having a straight surface.

Hook portion 420 of bracket 412 also includes a top portion 426 configured to engage a top surface and to support bracket 412 on a container having a straight side. Hook portion 420 further includes an inner portion 428 that is configured to face the inner wall of the container. Inner portion 428 forms a wall such that top portion 426 is generally orthogonal to the wall of inner portion 428 and outer portion 422 is connected to and extends generally orthogonally to top portion 426. Inner portion 428 also includes a generally tee-shaped support 430 extending outwardly therefrom.

Tee-shaped support 430 includes a base 432 that is tapered with a trapezoidal cross section such that a bottom end 434 of the base 432 is larger than a top end 436 of base 432. Tee-shaped support 430 further comprises a bar 438 extending from and generally orthogonally to base 432. Bar 438 is tapered with a trapezoidal cross section such that a bottom end 440 of bar 438 is larger than a top end 442 of bar 438.

Referring to FIGS. 70-74, a bracket 512 has replaced outer portion 122 and top portion 126 of bracket 112 with an adhesive pad 514 on the back of wall 528 so that bracket 512 can be adhesively adhered to a flat surface, such as a support strip 200, shown in FIGS. 59A-59C, or the side walls of the cart disclosed in the '916 patent.

Similar to bracket 112, bracket 512 includes a tee-shaped support 530 that includes a base 532 that is tapered with a trapezoidal cross section such that a bottom end 534 of the base 532 is larger than a top end 536 of base 532. Tee-shaped support 530 further comprises a bar 538 extending from and generally orthogonally to base 532. Bar 538 is tapered with a trapezoidal cross section such that a bottom end 540 of bar 538 is larger than a top end 542 of bar 538.

Referring to FIGS. 75-77, instead of lid 114, lid 414 can be used. Lid 414 omits central storage portion 116 of lid 114. Lid 414 includes spacers 416 extending downwardly from a bottom surface 418 of lid 414 to engage brackets 112. For a tight fit. FIG. 77 shows six spacers 416 so that, with twelve brackets 112 mounted on bucket 102, spacers 416 engage every other bracket 112. Those skilled in the art, however, will recognize that more or less than six spacers 416 can be used.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A tackle kit comprising:
a bracket having a wall, the wall having an upper portion and a lower portion, the lower portion having a generally tee-shaped support extending outwardly from a planar front face of the wall;
the upper portion having a hook extending outwardly from a convex curved rear face of the wall, the hook comprising:
a top portion extending outwardly from the rear face of the wall and generally orthogonally to the front face of the wall, the top portion having a convex curved edge;
an outer portion having a connected end and a free end, the connected end extending downwardly from the convex curved edge and generally orthogonally to the top portion; and
a lip extending from the free end toward the rear face of the wall;
the tee-shaped support comprising:
a tapered base having a trapezoidal cross section such that a bottom end of the base is larger than a top end of the base;
a tapered bar extending from and generally orthogonally to the base, wherein the bar has a trapezoidal cross section such that a bottom end of the bar is larger than a top end of the bar;
and
a first holder releasably attachable to the tee-shaped support, the first holder having a receiver configured to slide onto the tee-shaped support such that the tee-shaped support vertically supports the first holder.

2. The tackle kit according to claim 1, wherein the bracket is configured to hang over a wall of a bucket and wherein the kit further comprises a lid configured to fit over the bucket.

3. The tackle kit according to claim 2, wherein the lid comprises a recessed central storage portion configured to fit within a volume of the bucket.

4. The tackle kit according to claim 1, wherein the first holder comprises:

a first finger portion extending away from the receiver;
a second finger portion extending away from the receiver; and
a first through slot disposed between the first finger portion and the second finger portion, wherein each of the first and second finger portions comprises a tapered seating surface facing an other finger portion of the first and second finger portions, and
wherein each of the tapered seating surfaces has a notch formed therein, wherein the support releasably supports the first holder.

5. The tackle kit according to claim 4, wherein, when the bracket is supported by a bucket, the first holder is tilted at an angle relative to a horizontal plane such that the angle assists to keep a lure placed on the first holder seated on the first holder.

6. The tackle kit according to claim 1, wherein, when the bracket is supported by a bucket, the first holder is tilted at an angle relative to a horizontal plane such that the angle assists to keep a lure placed on the first holder seated on the first holder.

* * * * *